UNITED STATES PATENT OFFICE.

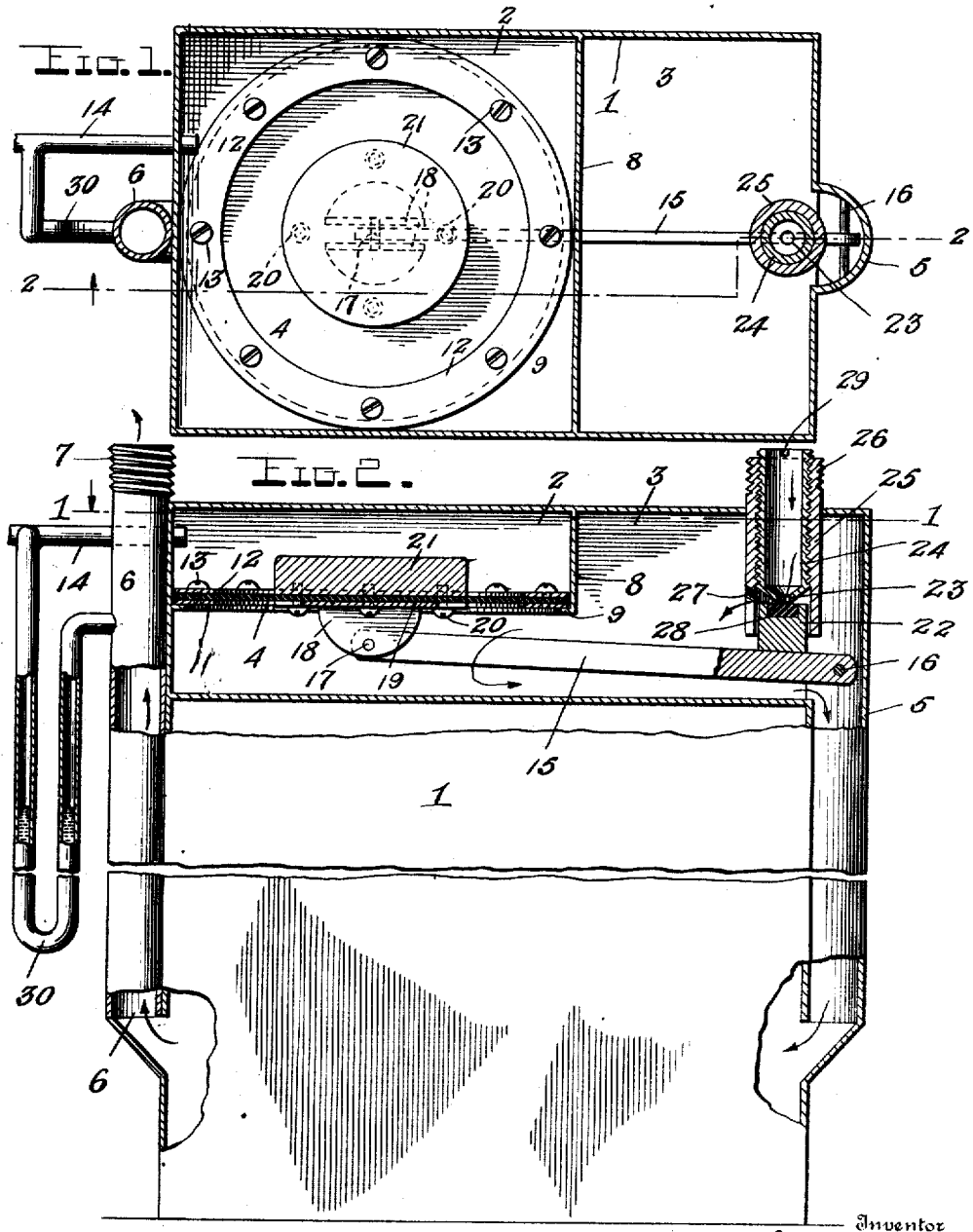

ROY A. DOANE, OF PALO ALTO, CALIFORNIA, ASSIGNOR OF NINE-TWENTIETHS TO N. B. NELSON, OF PALO ALTO, CALIFORNIA.

GAS-PRESSURE REGULATOR.

No. 916,343.

Specification of Letters Patent.

Patented March 30, 1909.

Application filed October 20, 1908. Serial No. 458,555.

*To all whom it may concern:*

Be it known that I, ROY A. DOANE, a citizen of the United States, residing at Palo Alto, in the county of Santa Clara and State of California, have invented certain new and useful Improvements in Gas-Pressure Regulators, of which the following is a specification, reference being had to the accompanying drawings.

This invention relates to improvements in gas pressure regulators and consists of the novel combination of devices and the novel features of construction hereinafter fully described and claimed.

The object of the invention is to provide a simple and practical pressure regulator which may be used in connection with any gas meter to provide a continuous flow of gas at a low pressure through the meter and the service pipes in a building or the like, when the gas in the main leading to the building is under high pressure.

The above and other objects of the invention, as will hereinafter more fully appear, are attained in the preferred embodiment of the invention illustrated in the accompanying drawings, in which—

Figure 1 is a horizontal section taken on the plane indicated by the line 1—1 in Fig. 2; and Fig. 2 is a side elevation of the same with parts broken away and in section, the plane of the section through the casing being indicated by the line 2—2 in Fig. 1.

While the improved pressure regulator illustrated in the drawings is especially adapted for use in connection with gas meters, it may be employed in other ways; and when used in connection with a gas meter it may be mounted upon the casing of the meter or within the same or it may be made separate and entirely disconnected and removed therefrom. As illustrated, it is arranged in the upper portion of the casing 1 of a gas meter of any form and construction and it comprises two chambers 2, 3 separated by a diaphragm 4. The top of the meter casing 1 forms the bottom of the larger chamber 3, which latter is for the gas and is in communication with the casing 1 through a tubular conductor 5 arranged upon one side or end of the meter, said conductor forming the inlet for the latter. The outlet for the meter is in the form of a similar conductor or pipe 6 arranged upon the other side of the meter and extending above the top of the device and externally screw threaded, as shown at 7, for the coupling which connects it to the distributing pipe of the building or other place in which the meter is used.

The chamber 2 is for air and is formed in the upper portion of the chamber 3 by a depending transverse partition or wall 8 and a horizontal partition or wall 9, the latter having a large circular opening over which the diaphragm 4 is arranged. Said diaphragm is in the form of a sheet of compressed leather or any other suitable flexible material, its edge being securely clamped between lower and upper rings 11, 12 by screws 13, as shown. The lower ring 11 surrounds the opening in the bottom or horizontal partition 9 and is soldered or otherwise secured thereto.

14 denotes an air vent in the form of a pipe having one end in communication with the chamber 2 and its other end extending preferably outside of the building so that the pressure in the chamber 2 will be the normal atmospheric pressure. The diaphragm 4 is connected to and adapted to operate a lever 15, which latter in turn operates the valve which controls the supply of gas to the gas chamber 3. Said lever is pivoted at one end on a pivot pin 16 arranged in the conductor or tube 5 and its other end is engaged with a pivot pin 17 arranged in spaced depending ears 18 which receive said end of the lever between them. The ears 18 are struck out from a metal plate 19 arranged upon the bottom of the diaphragm 4 and secured by screws 20, which latter also serve to connect a weight 21 to the top of the diaphragm. This weight 21 serves to actuate the lever 15 in a downward direction and thereby lower the gas inlet valve 22 from its seat 23. Said seat is in the form of an apertured cone on the end of an externally screw threaded tube 24 which is arranged in an internally screw threaded tubular connection 25 extending through the top of the gas chamber 3. Said tubular connection 25 has its upper end externally screw threaded at 26 to receive the coupling which connects it to the gas supply pipe leading from a high pressure main or the like, and its lower end forms a guide for the valve 22 and is notched or recessed as at 27 upon one side to permit the gas to escape into the chamber 3. Said valve 22 is in the form of a plug which rests upon or is secured to the lever 15 and has its upper end projecting into and vertically movable in the depending lower end of the tubular connection 25. Said upper end of the valve 22 is recessed and contains a packing of leather or the like 28 adapted to be moved toward and from the cone-shaped valve seat 23. The upper end of the valve seat tube or sleeve 24 may be notched, as shown at 29, so that a suitable blade or instrument may be engaged with said notches to permit the valve seat to be rotated for adjustment.

30 denotes a suitable liquid seal between the gas outlet pipe 6 and the air vent pipe 14. The operation of the device is as follows: Gas passes from a high pressure main through the valve seat 23 and into the chamber 3 when the valve 22 is opened and when the pressure of the gas is above a predetermined amount for which said valve seat is set, the weighted diaphragm 4 will be moved upwardly and will carry the lever 15 upwardly with it so that the valve 22 will be moved toward its seat 23 to stop or reduce the inlet of gas. The gas in the chamber 3 passes through the conductor or passage 5 to the meter 1, through the latter and then out through the pipe 6 to the distributing pipe or pipes of the building or other place in which the meter is used, thereby supplying gas to the building at a uniform low pressure. As the pressure in the chamber 3 varies the diaphragm 4 will move up and down and thereby close and open the inlet valve so that the gas passing through the meter and to the distributing pipe or pipes will be of uniform pressure.

While the preferred embodiment of the invention has been shown and described in detail, it will be understood that the invention is not limited thereto and that various changes in the arrangement of parts and the details of construction may be made without departing from the spirit or sacrificing any of the advantages of the invention.

Having thus described the invention what is claimed is:

1. In a pressure regulator, the combination of a casing having a partition provided with an opening, a diaphragm secured over the opening in the partition to separate the casing into a gas chamber and an air chamber, the air chamber having an air vent opening and the gas chamber having an inlet and an outlet, an inlet pipe projecting through the inlet opening in the casing, said pipe being internally screw threaded and having its projecting upper end externally threaded, the lower end of the pipe within the gas chamber having a smooth bore and a slot in one side, an externally threaded tubular valve seat arranged in the internally threaded portion of the pipe, the lower end of said valve seat being cone-shaped and disposed opposite the slot in the lower end of said pipe, a lever within the gas chamber fulcrumed at one end and pivotally connected at its other end to said diaphragm, a valve fixed to the lever intermediate its ends and adapted to project into and be guided by the smooth bore of the lower end of said pipe, and a packing upon the top of the valve to engage the cone-shaped lower end of the adjustable valve seat.

2. In a pressure regulator, the combination of a casing having a partition provided with an opening, a flexible diaphragm secured over said opening to separate the casing into an air chamber and a gas chamber, the air chamber having a vent and the gas chamber having an inlet and an outlet, a valve seat at said inlet, a weight arranged centrally upon the top of the diaphragm, a plate arranged centrally upon the bottom of the diaphragm and having pivot ears struck from it and bent downwardly into parallel relation, fastenings passed through said plate, the diaphragm and weight to unite said parts, a lever fulcrumed at one end and having its other end pivoted between said ears and a valve carried by the lever and adapted to co-act with said valve seat.

3. The combination of the casing of a gas meter having a horizontal partition adjacent its top to provide a gas chamber, an open horizontally disposed partition in the gas chamber to provide an air chamber, the latter having a vent, a pipe affording communication between the gas chamber and the lower chamber or compartment of the meter, an inlet pipe extending into the upper gas chamber and having its upper portion internally screw threaded and its lower portion provided with a smooth bore and a slot, an adjustable valve seat having an externally screw threaded body arranged in said pipe and provided with a cone-shaped lower end disposed opposite said slot, a lever fulcrumed at one end, a valve upon the intermediate portion of the lever and slidable in the lower end of said pipe, a packing upon the valve to engage the cone-shaped lower end of the valve seat, a flexible diaphragm over the opening in said partition in the upper gas chamber, a weight arranged centrally upon the top of the diaphragm, a plate arranged centrally upon the bottom of the diaphragm and having pivot ears struck downwardly from it, fastenings uniting the plate, diaphragm and weight and a pivot passed through the other end of the lever and said pivot ears.

In testimony whereof I hereunto affix my signature in the presence of two witnesses.

ROY A. DOANE.

Witnesses:
R. W. THORP,
W. F. MACPHERSON.